United States Patent [19]
Banister

[11] Patent Number: 6,088,602
[45] Date of Patent: Jul. 11, 2000

[54] HIGH RESOLUTION FREQUENCY CALIBRATOR FOR SLEEP MODE CLOCK IN WIRELESS COMMUNICATIONS MOBILE STATION

[75] Inventor: Brian C. Banister, San Diego, Calif.

[73] Assignee: LSI Logic Corporation, Milpitas, Calif.

[21] Appl. No.: 09/049,962

[22] Filed: Mar. 27, 1998

[51] Int. Cl.[7] .............................. H04B 1/16; G08C 17/00
[52] U.S. Cl. ..................... 455/574; 455/343; 455/38.3; 370/311; 370/335
[58] Field of Search .................. 455/574, 38.3, 455/343, 422, 403, 550; 370/311, 335

[56] References Cited

U.S. PATENT DOCUMENTS

| | | |
|---|---|---|
| 4,209,786 | 6/1980 | Barley et al. . |
| 4,331,941 | 5/1982 | Kovalick et al. . |
| 5,101,506 | 3/1992 | Walls . |
| 5,142,699 | 8/1992 | Sato et al. . |
| 5,283,568 | 2/1994 | Asai et al. . |
| 5,737,323 | 4/1998 | Lansdowne ............................. 370/311 |
| 5,740,129 | 4/1998 | Frampton ................................. 368/10 |
| 5,740,517 | 4/1998 | Aoshima ................................ 455/38.3 |
| 5,758,278 | 5/1998 | Lansdowne ............................. 455/343 |
| 5,881,055 | 3/1999 | Kondo .................................... 370/311 |
| 5,883,885 | 3/1999 | Raith ...................................... 370/311 |
| 5,949,812 | 9/1999 | Turney et al. .......................... 375/200 |
| 5,950,120 | 9/1999 | Gardner et al. ........................ 455/343 |
| 5,995,820 | 1/2000 | Young et al. ........................... 455/343 |
| 6,009,319 | 1/2000 | Khullar et al. ......................... 455/343 |
| 6,016,312 | 1/2000 | Storm et al. ............................ 370/311 |

*Primary Examiner*—Dwayne D. Bost
*Assistant Examiner*—Joy K. Redmon
*Attorney, Agent, or Firm*—Mitchell, Silberberg & Knupp LLP

[57] ABSTRACT

The present invention concerns a high resolution calibrator for a sleep mode clock of a mobile station in a wireless communications system. When the mobile station is in idle mode (i.e., listening to a paging channel periodically, but otherwise taking no action), the control processor commands the mobile station to enter into sleep mode to minimize power consumption. During sleep mode, the high-frequency reference clock and circuitry clocked by it are turned off. Only the calibrated low-frequency clock remains operating to clock the sleep logic. In a preferred version, the calibrator includes two counters: a first counter which counts up to S*T0 cycles of the super chip rate clock through one data frame, then rolls over to zero, and a second counter which counts cycles of the sleep mode clock. Also included are three registers: a first register which stores a first value CNTSLP which is input from the second counter at the end of a calibration period and subsequently at wake up time; a second register which stores a second value SYSTIME1 which is input from the first counter at the beginning of a calibration period; and a third register which stores a third value SYSTIME2 which is input from the first counter at the end of a calibration period. Wake up time is determined using a relative frequency which is calculated from values stored in the above registers.

25 Claims, 3 Drawing Sheets

HIGH RESOLUTION FREQUENCY CALIBRATOR FOR SLEEP MODE CLOCK IN WIRELESS COMMUNICATIONS MOBILE STATION

BACKGROUND OF THE INVENTION

1. Field of the Invention

The present invention generally relates to the art of wireless communications system. In particular, the present invention relates to minimizing power consumption in mobile stations.

2. Description of the Related Art

A. Basic Wireless System Architecture.

As shown in FIG. 1, a cellular network is comprised of three fundamental parts:

(1) a mobile station 1 (which is carried by the subscriber);
(2) a base station subsystem 2 (which controls the radio link with the mobile station); and
(3) a network subsystem 3 (which is interfaced to the public fixed network 4 and the base station subsystem).

The network subsystem and the base station subsystem communicate across an interface 5, while the mobile station and the base station subsystem communicate using a radio link 6.

Mobile Station. The mobile station is the "phone" part of the wireless communication system. The mobile station may be fixed or portable. Fixed mobile stations are permanently installed in a car or a stationary location. Portable units include bag phones and hand-portable phones (commonly called "cell phones"). Hand-portable phones are becoming increasingly popular because they can be carried easily on the person of the subscriber. A mobile station includes an antenna 7 for transmitting and receiving radio signals from the base station subsystem.

Base Station Subsystem. The base station subsystem comprises two fundamental elements, (1) one or more base transceiver stations (8 and 9) and (2) a base station controller 10. These components communicate across another interface 11. A base transceiver station includes radio transceivers that handle radio-link protocols with the mobile station and an antenna 12 for communication with mobile stations.

The base station controller manages the radio resources of the base transceiver stations. It also manages handovers (passing the audio from cell to cell during a call), frequency hopping (changing operating frequency to maintain signal quality) and radio-channel setup.

Network Subsystem. The basic element of the network subsystem is the mobile services switching center (MSC) 13. The MSC is the interface of the cellular network to the public fixed network and, as such, basically performs the functions of a switching node of the public fixed network. The MSC also routes calls from the public fixed network (via the base station controller and the base transceiver station) to the mobile station. The MSC also provides the wireless system with individual information about the various mobile stations and performs the functions of authentication, location updating, and registration. The MSC may operate in conjunction with other functional entities which further comprise a network subsystem, such as registers which hold information regarding current mobile station location and subscriber information.

B. Radio Link.

In conventional wireless communications technology, user data (e.g. speech) is encoded in a radio frequency for transmission and reception between a base station and a mobile unit. Because the number of available radio frequencies, or "channels," for cellular system is less than the number of all possible users, the system is "trunked." Trunking is the process whereby users share a limited number of channels in some predetermined manner.

A common form of trunked access is the frequency-division multiple access (FDMA) system. In FDMA, the limited channels are shared by all users as needed. However, once a channel is assigned to a user, the channel is used exclusively by the user until the user no longer needs the channel. This limits the number of concurrent users of each channel to one, and the total number of users of the entire system, at any instant, to the number of available channels.

Another common trunking system is the time-division multiple access (TDMA) system. TDMA is commonly used in telephone networks, especially in cellular telephone systems, in combination with an FDMA structure. In TDMA, data (speech) is digitized and compressed to eliminate redundancy and silent periods, thus decreasing the amount of data which is required to be transmitted and received for the same amount of information. Each of the channels used by the TDMA system is divided into "frames" and each of the users sharing the common channel is assigned a time slot within the frames. The TDMA system appears, to each of the users sharing the channel, to have provided an entire channel to each user.

Code-division multiple access (CDMA), yet another common trunking system, is an application of spread spectrum techniques. The main advantage of CDMA systems as compared to TDMA systems is that all the mobile stations can share the full transmission spectrum asynchronously, that is, there is no need for synchronization among mobile stations (only between a mobile station and a base station).

C. Mobile Station Architecture.

As shown in FIG. 2, mobile stations generally comprise two basic parts, the RF (radio frequency) part 20 and the digital part (or baseband processing circuitry) 21. The RF part operates receiving, transmitting, and modulation functions. The digital part handles data processing, control, and signaling functions. As shown, the radio frequency part includes an antenna 27 for receiving and transmitting radio signals. A radio signal received by the radio frequency part is converted to a lower frequency signal and delivered 22 to the digital part. Likewise, a signal generated by the digital part is delivered 23 to the radio frequency part, which in turn converts the signal to a higher frequency signal, and transmits that higher frequency signal.

The digital part is operatively connected to a handset 24, which has a speaker 25 and a mouthpiece 26. All or part of the radio frequency part and the digital part can be disposed within the handset, as is the case with cell phones.

Also included in the mobile station architecture (but not shown in FIG. 2) is a reference clock, which is used to drive the digital hardware. Clock circuitry may also include tuning circuitry or temperature compensation circuitry to make the reference signal more accurate. A control processor performs the control functions of the mobile station, including, for example, power control and the selection of different channels.

For CDMA systems, mobile stations generally include the following elements. Transmitting circuitry transmits as spread spectrum signals data (e.g. speech) provided by a user, while receiving circuitry receives spread spectrum signals and converts the signals into a form intelligible to the user. Pseudorandom noise (PN) sequence generator circuitry operationally connected to the transmitting circuitry and the receiving circuitry enables the mobile station to transmit and receive spread spectrum signals. Prior to transmission, each data bit is spread into a number of "chips" which can be transmitted in a bandwidth-limited channel along with signals of many other users, who can all share the channel. A chip rate clock, operating at a chip rate, clocks the PN sequence generator circuitry.

D. Sleep Circuitry.

One significant challenge facing designers of mobile stations is conserving power. Because mobile stations are generally powered by batteries, mobile stations which consume available power quickly have a significant disadvantage. One manner in which power can be conserved is to introduce sleep circuitry into the mobile station. With sleep circuitry, when the mobile station is in idle mode (i.e., listening to a paging channel periodically, but otherwise taking no action), the control processor commands the mobile station to enter into a sleep mode to minimize power consumption. During sleep mode, portions of the mobile station are shut down, thereby conserving energy. A design goal is to optimally use the sleep mode by turning off as many electronic components as possible.

Moreover, CDMA spread spectrum wireless communication systems require the maintenance of a high timing accuracy during sleep mode, as they employ rapid PN sequences. Since the PN sequences are rapid and the mobile station PN sequence must be time aligned with the transmitted base station sequence, the wake up time of the system must be very accurate. It would be advantageous if the system could power off the high precision, temperature compensated, high speed reference clock used to maintain the PN sequences, using instead a slower, lower power clock with less precision to determine the length of the sleep period.

A problem with current sleep mode circuitry is that, while the mobile station is in sleep mode, the high speed reference clock is still in operation. Because of the high frequency of the reference clock, significant power is consumed even during sleep mode. Additionally, prior techniques for calibrating a low speed clock are not sufficiently accurate for CDMA systems.

Therefore, objects of the present invention include minimizing power consumption in mobile stations by turning off the high speed reference clock and as many other components as possible, and providing for high accuracy calibration of a low speed clock used during sleep mode.

SUMMARY OF THE INVENTION

These objects are achieved by the present invention, which comprises a high resolution calibrator for a sleep mode clock of a mobile station in a wireless communications system. When the mobile station is in idle mode (i.e., listening to a paging channel periodically, but otherwise taking no action), the control processor commands the mobile station to enter into sleep mode to minimize power consumption. During sleep mode, the high-frequency reference clock and circuitry clocked by it are turned off. Only the calibrated low-frequency clock remains operating to clock the sleep logic.

In a preferred version, the calibrator of the present invention calibrates a sleep mode clock in a CDMA mobile station to a chip rate clock operating at a chip rate, wherein data is segmented into frames having a duration T0 seconds. The mobile station includes a super chip rate clock which operates at a frequency S which is N times the chip rate, and a frame counter which contains a value FRMS at the end of a calibration period. The calibrator itself includes two counters, a first counter which counts up to S*T0 cycles of the super chip rate clock through one data frame, then rolls over to zero, and a second counter which counts cycles of the sleep mode clock. Also included are three registers: a first register which stores a first value CNTSLP which is input from the second counter at the end of a calibration period and subsequently at wake up time; a second register which stores a second value SYSTIME1 which is input from the first counter at the beginning of a calibration period; and a third register which stores a third value SYSTIME2 which is input from the first counter at the end of a calibration period. Wake up time is calculated using a relative frequency which is equal to [SYSTIME2−SYSTIME1+(T0*S) (FRMS) ]/CNTSLP.

These and other aspects, features, and advantages of the present invention will be apparent to those persons having ordinary skill in the art to which the present invention relates from the foregoing description and the accompanying drawings.

DESCRIPTION OF THE PREFERRED EMBODIMENTS

A. Calibration Design Concerns

In certain wireless systems such as CDMA systems, a "slotted" mode is used for paging channel monitoring. The "slot" is a period of time, which may be divided into several "frames" of data, during which the mobile must monitor the paging channel. During any other period of time the mobile does not need to monitor the paging channel. This non-monitoring time can be used for calculations and sleep mode. In practice, a Temperature Compensated Crystal Oscillator (TCXO) is used for a high precision frequency reference by mobile stations. These units consume significant current, and so it is desirable to turn them off during sleep mode.

Figure 1:
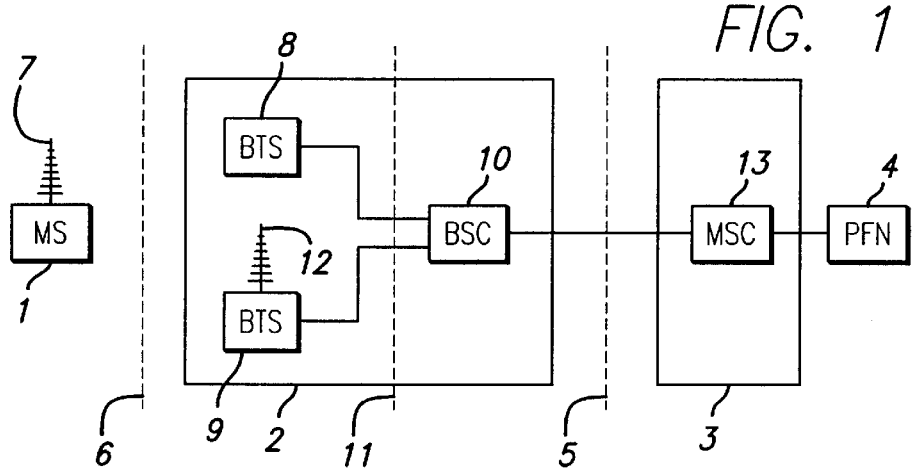
FIG. 1 is a block diagram of a wireless communications system.
Figure 2:
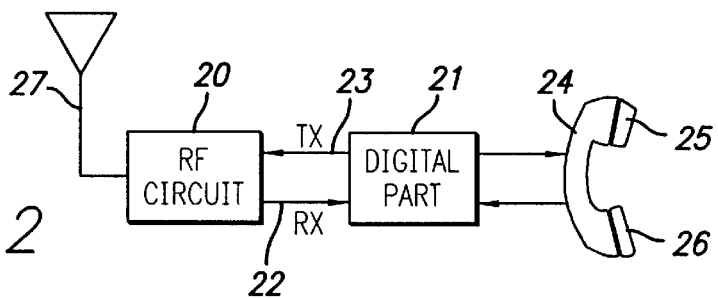
FIG. 2 is a block diagram of the basic architecture of a mobile station.
Figure 3:
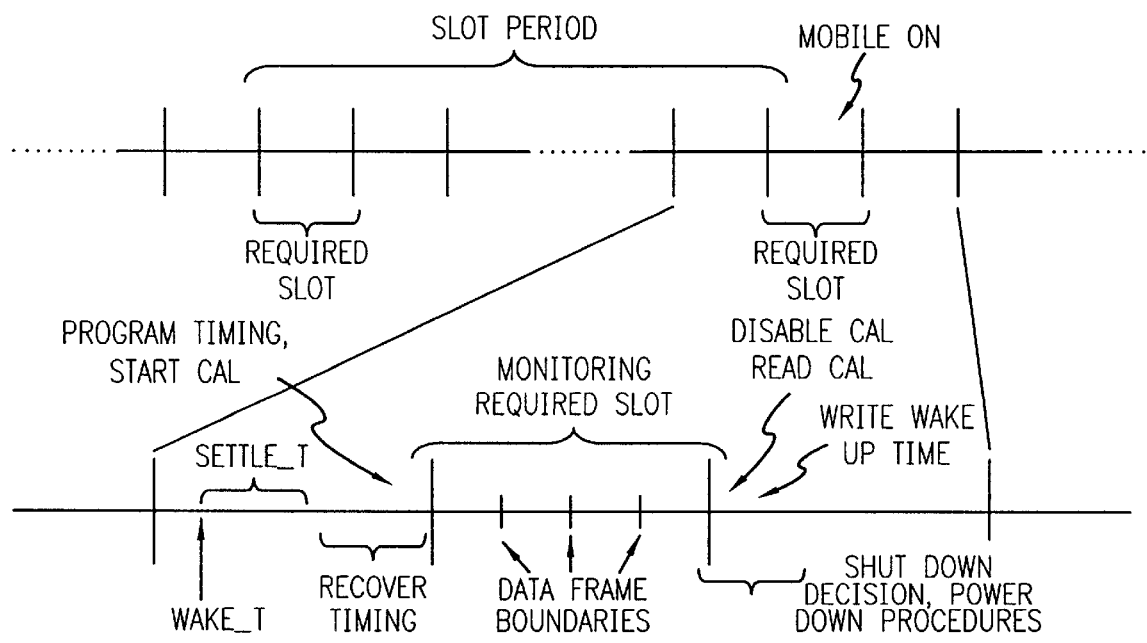
FIG. 3 is a timeline of "slotted" mode activity.

The sequence of events for operation in a slotted mode are shown in FIG. 3. The slot period is the time between the slots that are required to be monitored. The mobile station must power up all receive portions of the system to demodulate the frames during the slot. It must power up the receiver early in order to allow the recovery of the precise timing. Prior to turning on the receiver there is a settling time to allow the TCXO and phase locked loops (PLL) used in sychronization to settle.

After the timing has been recovered and reprogrammed, the calibration for the next sleep period is started and is perfonned while the frames of data are being received. When reception is complete, the calibration process is disabled and the calibration results are read. Using these results, the Control Processor (CP) of the mobile station calculates the appropriate value for the wake up time of the unit and turns all appropriate systems off.

According to the present invention, when the mobile station is in idle mode (i.e., listening to a paging channel periodically, but otherwise taking no action), the control processor commands the mobile station to enter into sleep mode to minimize power consumption. During sleep mode, the high frequency (for example, 8 MHz) reference clock and circuitry clocked by it are turned off. Only a low frequency (for example, 32 kHz) clock remains operating at all times to clock the sleep logic. A clock operating in the kilohertz frequency range typically consumes substantially less power than a clock operating in the megahertz range. This low frequency "sleep mode clock" also consumes less power because it is calibrated to the high frequency reference clock, which is temperature compensated, and thus the sleep mode clock itself does not require temperature compensation. Additionally, counters relating to the sleep mode clock require fewer registers and on-chip gates than the high frequency reference clock would require.

In a CDMA system, the 8 MHz clock is synchronized to the base station, providing a high accuracy reference. The frequency may be tuned by a digital-to-analog converter driving an external tuning circuit. During sleep mode, the digital-to-analog converter and the 8 MHz oscillator are powered down, leaving only a free running 32 kHz clock. Because the power-up time needs to be fairly accurate, the 32 kHz clock is calibrated to the 8 MHz clock while both are powered on, allowing the CP to determine the sleep time in 32 kHz cycles.

Although it can be expected that the 8 MHz clock and the 32 kHz clock will be generally accurate, it is possible that the clocks will provide only approximate frequency values. In the CDMA system, however, it should be noted that the 8 MHz clock will generally be tuned to an accuracy of at worst 0.1 ppm. The 32 kHz clock may vary between 31 kHz to 33 kHz as a result of temperature changes, inaccuracies in the clock crystal, etc. Assuming the 32 kHz clock is otherwise accurate, frequency changes due to temperature variance are generally within plus or minus 50 ppm. The frequency of a clock designated as a "32 kHz clock" may actually only approximate 32 kHz. Therefore, the present invention provides for a method and apparatus for calibrating the clocks before sleep mode.

Where a Direct Sequence Spread Spectrum (DSSS) method is used, such as in a CDMA system, an information signal is multiplied by a high speed PN (Pseudorandom Noise) sequence to perform spectral spreading. The resulting modulated values are commonly called "chips" and the "chip rate" is the clock speed of the PN generator. For purposes of illustration only, the following description assumes a chip rate of 1 MHz. A preferred version of the present invention utilizes a "super chip" counter which counts ⅛th chips through a system frame. The clock for this counter is thus eight times the chip rate, 8 MHz, and provides resolution to a fraction of a chip.

B. Calibration Circuitry

Figure 4:
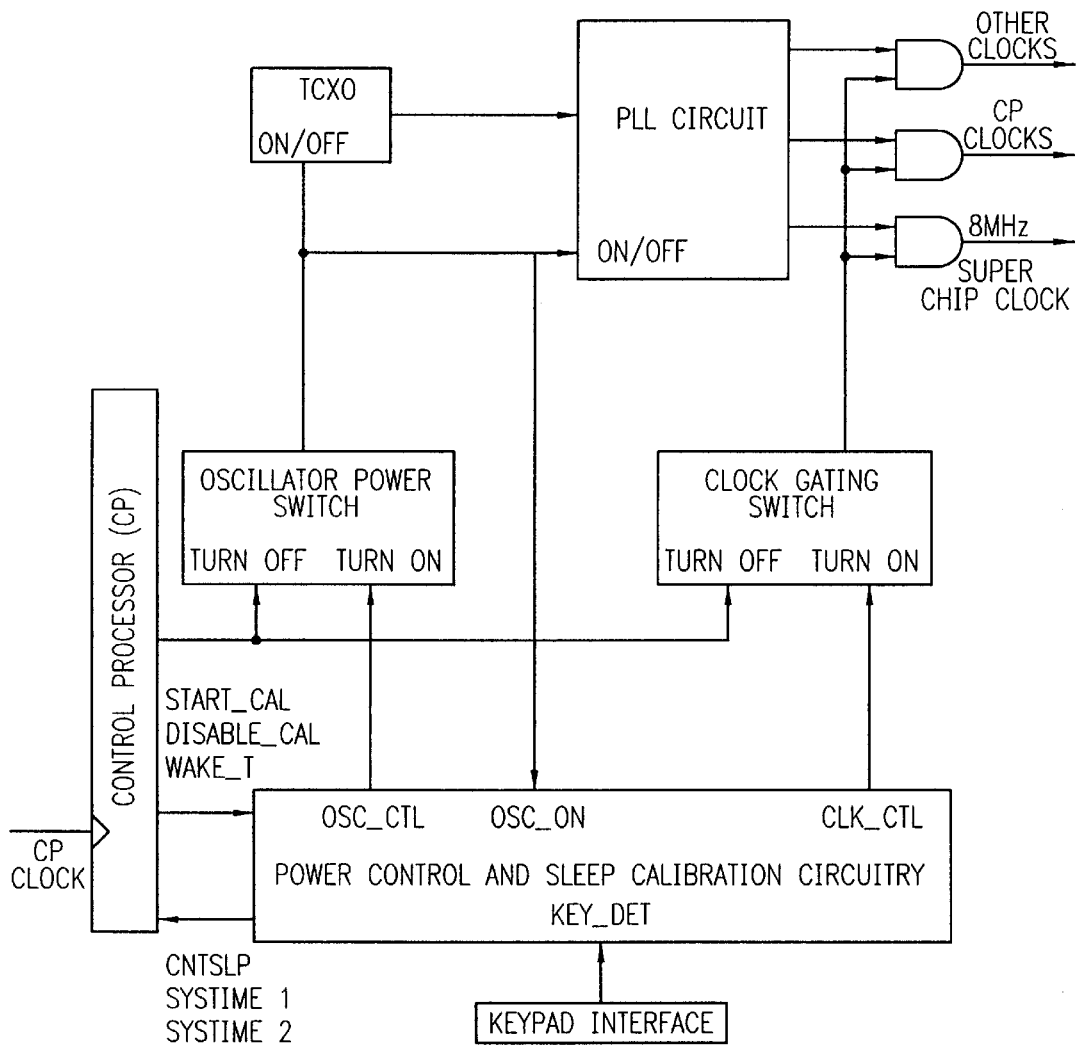
FIG. 4 is a block diagram of a preferred version of sleep control circuitry of the present invention.
Figure 5:
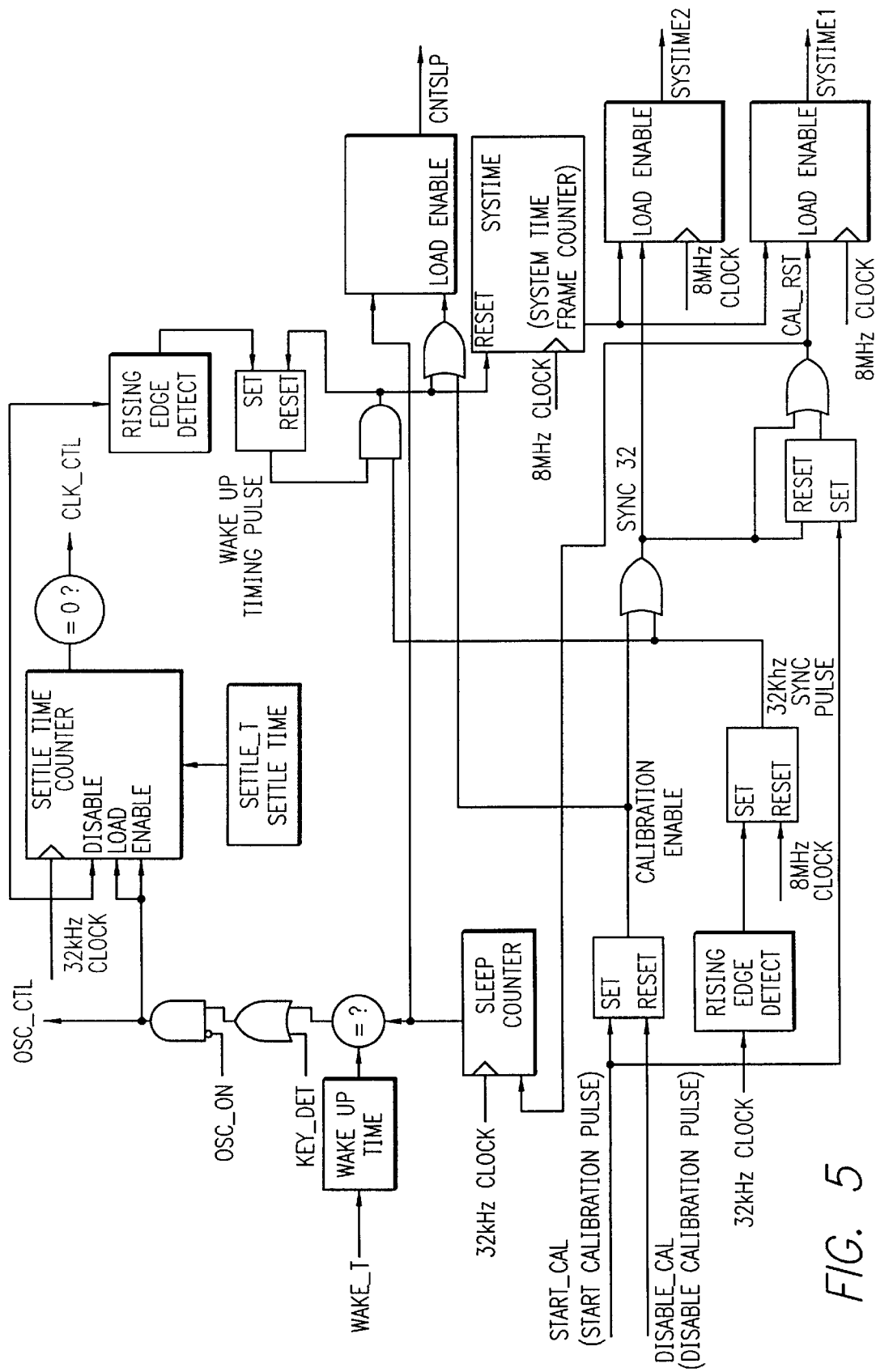
FIG. 5 is a schematic of a preferred version of power control and sleep calibration circuitry of the present invention.

A preferred version of the power control system of the present invention is illustrated in FIG. 4, and FIG. 5 shows a preferred version of the calibration and timing circuit. The calibration circuitry of the present invention provides for precision calibration of the relative frequencies and relative phase of the high rate TCXO and lower speed 32 kHz oscillator, and a mechanism for timing wake up to use this information. Extra hardware requirements are minimized by reusing some circuits that exist for other purposes elsewhere, such as the system frame counter.

Additionally, the calibration circuitry of the present invention optimizes calibration by performing all read and write functions synchronous with the slower clock. In this way the time uncertainty introduced is the inverse of the higher frequency, and thus a smaller amount of time. Similarly, rather than using a chip rate clock, the invention uses a multiple of the chip rate clock which is at a higher frequency. This is typically already available to allow for fine timing adjustment of the receiver and transmitter.

One possible method for performing calibration is to employ two counters clocked at the two frequencies. The present invention minimizes extra circuitry by eliminating one of those counters and instead using a preexisting super chip counter for the high speed clock. The value of this super chip counter rolls over every frame, and thus it does not count out the full calibration period; the CP computes the full time based on its own knowledge of the passing of frames. This saves the creation of a separate counter and saves gates by not requiring the extra bits for a larger counter to be placed in hardware. Additionally, the same counter is used for both calibration and sleep time control.

In a preferred version of the present invention, two counters are used in calibration:

SYSTIME: super chip (greater than chip rate) counter, counts cycles of the super chip rate clock through one frame, then rolls over to zero.

CNT32: counts sleep mode (32 kHz) clock cycles, used for both calibration and sleep duration.

Three registers store calibration values:

CNTSLP: stores the value of counter CNT32 at the end of the calibration period and also subsequently at the wake up time.

SYSTIME1: stores the value of SYSTIME at the beginning of the calibration period.

SYSTIME2: stores the value of SYSTIME at the end of the calibration period.

Two registers are loaded by the CP in connection with determining the wake up time:

WAKE_T: stores the value of CNT32 at which to begin the wake up procedure.

SETTLE_T: stores the settle time required for settling of hardware, such as the high frequency reference clock and associated PLLS, upon wake up.

C. The Normal Calibration and Sleep Procedure

Referring to FIG. 5, at the beginning of a calibration period, the CP starts the calibration process by pulsing the signal START_CAL. This enables calibration and causes a pulse on the CAL_RST line, synchronized to the first 8 MHz clock after the next 32 kHz rising edge. The CAL_RST pulse resets CNT32 and causes the value SYSTIME to be written into SYSTIME1. While calibration is enabled, the signal SYNC32 is generated as a pulse of one 8 MHz cycle duration which occurs on the first 8 MHz clock after each 32 kHz clock rising edge. This is a pulse that occurs at an average rate of 32 kHz but is synchronized to 8 MHz, which controls the writing of the value of SYSTIME to SYSTIME2. Thus, SYSTIME2 always contains the first value of SYSTIME that occurs after the 32 kHz clock edge. In addition, the register CNTSLP is constantly being written with the value CNT32 while the process is enabled.

At the end of the calibration period, the CP sends the DISABLE_CAL pulse. When the calibration process is disabled, neither CNTSLP nor SYSTIME2 are written to any more. The CP then reads the values of SYSTIME1, SYSTIME2 and CNTSLP and uses these to perform the calibration mathematics.

It is not necessary to know the duration of the calibration prior to starting it, so the duration can be maximized if the required receive time is variable and not known a priori. The calibration period generally takes place over several frames. Counter SYSTIME does not count past one frame, but instead a counter maintained by software counts whole frames to maintain system synchronization. Thus the total number of 8 MHz clocks in a calibration period can be found by the equation:

8 MHz clocks=N8=SYSTIME2−SYSTIME1+T0*8 MHz*FRMS where T0 is the duration, in seconds, of a frame, and FRMS is the number of frames that occurred between the storing of SYSTIME1 and SYSTIME2.

The number of 32 kHz clocks in that same period of time is given simply by:

32 kHz clocks=N32=CNTSLP.

The phase of the 32 kHz oscillator is given by the value of SYSTIME1. Using all of the above information, the desired wake up time can be programmed in WAKE_T. At the time determined by WAKE_T+SETTLE_T cycles of the 32 kHz clock after the time SYSTIME1, the master 8 MHz counter SYSTIME will be reset to zero. Using all of this information, the error can be calculated and a correction term can elsewhere be added to the SYSTIME value to give approximately the correct frame timing. This timing estimate is then used as the center around which requisition is performed. Once requisition is complete, the calibration process can be started again.

The relative frequency is given by:

F=N8÷N32

Let T2=desired time to be powered up and start timing requisition;
T1=the time at which the calibration was started
where T1 and T2 are measured in seconds, and it is assumed that there is no or negligible error in the 8 MHz clock. Then the programmed value of WAKE_T is:

WAKE_T=floor((T2−T1)*8 MHz÷F)−SETTLE_T

Where floor(x)=max(y) such that y is less than or equal to x, where y is an integer.

Once CNT32 reaches the wake up value WAKE_T, the hardware wake up process begins. The TCXO and the PLLs are turned on, as is the settle time counter, which is loaded with the value SETTLE_T. Once SETTLE_T more 32 kHz clock cycles have occurred, the TCXO and PLLs are assumed to have settled and the clocks are all gated on. At this time SYSTIME is reset and a final value of CNT32 is written to CNTSLP; this is not needed for normal operation but is required when there is an early wake up initiated by a user (discussed below). The reset of SYSTIME is performed so that it begins at a known state at the time corresponding to the newly loaded CNTSLP.

The actual wake up time is given by:

T2A=T1+(WAKE_T+SETTLE_T)*F÷8 MHz

Note that for a normal wake up (as opposed to an early wake up initiated by a user), WAKE_T+SETTLE_T=CNTSLP (value loaded at wake up time).

On average, there are F 8 MHz clock cycles in each 32 kHz clock cycle, and the power up can occur on any of those cycles. The value of SYSTIME 1 is used to determine the exact 8 MHz clock at which SYSTIME is reset, allowing for subsequent correction of that counter value elsewhere in the system. That is to say, the calculated value:

T_ERROR = T2 − T2A
= T2 − T1 − (WAKE T + SETTLE T)*F÷8 MHz is known to be:

T_ERROR=floor(T2÷32 kHz)*32 kHz to an accuracy of one 8 MHz clock cycle. That is, the turn on time in fact occurs at the last 32 kHz cycle that occurs previous to the desired turn on time, due to the fact that this is the best resolution possible from a 32 kHz counter. This time is known, and thus can be adjusted, because the phase of the 32 kHz is known from SYSTIME 1, as shown by the inclusion of T1 in the equation for T_ERROR (the only difference between SYSTIME1 and T1 here is the units: T1 is given in seconds, SYSTIME1 is in units of 8 MHz clock cycles).

D. Early Wake Up Initiated By Users (Via Key Press)

It is sometimes necessary to exit sleep mode prior to the anticipated wake up time. For example, it is possible in cellular telephony to have long sleep periods of 10 seconds or more. If the phone user starts to initiate a call, the unit must wake up and require the system earlier than the WAKE_T value would allow. It is not acceptable for the user to have to wait up to 10 seconds to start the call. Thus, the present invention provides a mechanism for early wake up.

The keypad interface provides a signal to the power control and sleep circuitry (KEY_DET). As shown in FIG. 5, this is used to preempt the comparison with WAKE_T and cause immediate entry into the wake up procedure. There is still a settling time determined by SETTLE_T, but now the value loaded into CNTSLP at the wake up time is not the anticipated value as given above. Rather, the wake up time for early wake up initiated by a user is:

T2A=T1+(CNTSLP)*F÷8 MHz

Note that CNTSLP is not equal to WAKE_T+SETTLE_T. Given the value of CNTSLP read by the CP after an early wake up, the actual time of the wake up can be calculated, and the correction applied to SYSTIME similar to normal wake up.

E. Additional Long Term Sleep Mode Clock Calibration

The calibration techniques so far described implicitly assume that the precise frequency of the 32 kHz oscillator is the same during the sleep period as it is during the calibration period. In practice this may not be the case. It is possible that the act of turning off all unneeded system components will slightly modify the supply voltage available to the 32 kHz oscillator. This can slightly modify the operating frequency of the oscillator, resulting in incorrect wake up times, with a bias towards earlier wake up times if the oscillator runs faster during sleep, or later wake up times if the oscillator runs slower during sleep. Since this bias will on average be consistent between sleep periods, this can also be calibrated and compensated.

Let the frequency of the 32 kHz oscillator during the calibration period be:

F32=frequency of 32 kHz oscillator while system is on (not exactly 32 kHz)

The frequency during sleep might be modified by a factor D, such that:

D*F32=frequency of oscillator during sleep, where D is approximately equal to one.

Then the actual wake up time differs from T2A above and is given by

T2B=T1+(CNTSLP)*F÷8 MHz

The software can estimate the value of D by averaging over many sleep periods:

D_EST=mean ((CNTSLP*F/8 MHz)÷(T2B−T1))

where T2B is determined after the system has recovered exact timing upon waking up. For this formulation, T2B must have occurred from a WAKE_T setting that did not use a previous estimate D_EST.

The estimate D_EST is then applied towards an improved calibration value by using the value F÷D_EST in place of F, giving:

WAKE_T=floor((T2−T1)*8 MHz÷F*D_EST)−SETTLE_T

In practice, a recursive formulation of D_EST would generally be used.

Let D_EST[n]=the estimate of D after the $n^{th}$ sleep period.

G=an update gain of the estimate

Then

D_EST[n]=(1−G)*D_EST[n−1]+G*((T2−T1)÷(T2B−T1)÷D_EST[n−1])

The algorithm would be initialized with D_EST[0]=1. The factor G determines the effective averaging period of the calibration. A large G makes for a shorter averaging period, with faster convergence but a noisier estimate. A small value of G gives a longer averaging period, with slower convergence but a less noisy estimate. In all cases G would be selected such that:

0<G<1

F. Application Considerations

Since the present invention allows the high speed clock to be turned off during sleep mode while a lower speed clock keeps track of the sleep time, there is a power savings for the mobile. This is because a lower speed clock and counters using this clock will consume less power than a higher speed clock. Thus, this invention can significantly increase the standby time of a cellular phone. This means longer battery life and a longer time between battery recharges by a user. Standby time is considered a key parameter in evaluating the relative worth of competing cellular phones on the market.

The present invention allows for very high accuracy calibration which reduces the requisition time of a DSSS system. For example, consider a DSSS system with the following parameters:

* a "chip" rate (PN clock rate) of 1 MHz
* a 32 kHz low speed sleep clock
* a sleep period of 1 second, with 50 ms receiving and 950 ms "sleeping"
* a requisition rate of 5 millisecond per microsecond of search window When the mobile wakes up, there is some timing uncertainty range given by the assumed error margin of the 32 kHz frequency. The requisition rate given above is an indication of how long it takes to require given that uncertainty range. For example, if the timing is known to be within a window of 50 us, then the requisition time is (5 ms/us)*(50 us)=250 ms. Clearly such a long requisition time is not desirable when the total off time is only 950 ms.

The calibration is assumed to occur over the 50 ms period during which the, full system is operational.

The performance of a typical calibration scheme would be given by:

calibration accuracy=(±1 clock cycle, 32 kHz clock)/ (calibration time)
=±31.25 us/50 ms
=±625 ppm wake up time uncertainty=(sleep time) * (cal accuracy)
=±950 ms * 0.000625
=±593.75 us requisition time=(wake up time uncertainty) * (requisition rate)
=(2*593.75 us) * (5 ms/us)
=5.9375s Clearly, the calibration accuracy given by standard techniques is insufficient for use in the DSSS system described above, as the requisition time greatly exceeds the sleep period.

The present invention allows for more accurate clock calibration, where the preferred embodiment gives performance as described below:

calibration accuracy=(⅛ clock cycle, 1 MHz PN clock)/ (cal. time)
=±0.125 us/50 ms
=±2.5 ppm wake up time uncertainty=(sleep time) * (cal accuracy)
=±950 ms * 0.0000025
=±2.375 us requisition time=(wake up time uncertainty) * (requisition rate)
=(2*2.375 us) * (5 ms/us)
=23.75 ms Thus, for this example, the on-time experienced by a system using the present invention is degraded from the ideal by 23.75 ms.

In addition to providing a high accuracy measure of the relative frequencies of the TCXO and 32 kHz clock, the present invention allows for the determination of the phase of the 32 kHz clock relative to frames. That is, the location of a frame boundary within the appropriate 32 kHz cycle (31.25 us) is known. Without this knowledge there is a residual wake up time uncertainty of 31.25 us, independent of the length of the calibration or the length of the sleep.

The present invention also maximizes the calibration time when the active receiving time is not known prior to the beginning of calibration. Since the calibration accuracy is ±(⅛ clock cycle, 1 MHz PN clock)÷(cal. time), maximizing the calibration time provides higher accuracy.

The present invention adds a minimum amount of digital circuitry to a system, as it uses hardware that already exists for other functions rather than requiring the generation of additional circuitry. In particular, the only circuitry added which is part of the 8 MHz clock domain is the registers SYSTIME1 and SYSTIME2. There is no additional counter dedicated to calibration. This is beneficial because the current drain for circuits in the faster clock domain is greater than those in the slower clock domain.

The difference of the sleep clock oscillator frequencies between the waking and sleeping states are calibrated. It is possible for the oscillation frequency to change when most of the system is powered down for sleep mode, since the current drawn from the batteries changes and may effect the voltage available to the oscillator. Measuring this effect allows for better precision of the wake up times.

Flexibility is another advantage of the present invention. Certain constraints can added to the design, such as making the START_CAL pulse synchronous with frame boundaries. Many details of the logic in the diagrams can easily be changed. For instance, level triggered latches can be used in place of edge triggered registers, and vice versa.

Although the present invention has been described in detail with regard to the exemplary embodiments and drawings thereof, it should be apparent to those skilled in the art that various adaptations and modifications of the present invention may be accomplished without departing from the spirit and the scope of the invention. Accordingly, the invention is not limited to the precise embodiment shown in the drawings and described in detail hereinabove. Therefore, it is intended that all such variations not departing from the spirit of the invention be considered as within the scope thereof as limited solely by the claims appended hereto.

In the following claims, those elements which do not include the words "means for" are intended not to be interpreted under 35 U.S.C. § 112 ⊂ 6.

What is claimed is:

1. A high resolution calibrator for calibrating a sleep mode clock in a wireless communications mobile station to a chip rate clock operating at a chip rate and which can be turned off during sleep mode, wherein data is segmented into frames having a duration T0, and the mobile station includes a super chip rate clock which operates at a frequency S which is N times the chip rate, and a frame counter which contains a value FRMS at the end of a calibration period, said calibrator comprising:

a first counter which counts T0*S cycles of the super chip rate clock through one data frame, then rolls over to zero;

a second counter which counts cycles of the sleep mode clock;

a first register which stores a first value CNTSLP which is input from the second counter at the end of a calibration period and subsequently at wake up time;

a second register which stores a second value SYSTIME1 which is input from the first counter at the beginning of a calibration period;

a third register which stores a third value SYSTIME2 which is input from the first counter at the end of a calibration period, wherein wake up time is calculated using a relative frequency which is equal to

[SYSTIME2−SYSTIME1+(T0*S)(FRMS)]/CNTSLP.

2. The calibrator according to claim 1 wherein said sleep mode clock runs between 31 kHz and 33 kHz.

3. The calibrator according to claim 1 wherein storage of SYSTIME1 and SYSTIME2 is synchronized to the sleep mode clock.

4. The calibrator according to claim 1 wherein wake up can be initiated by a user before a sleep period ends.

5. The calibrator according to claim 1 wherein said calibrator compensates for frequency variations in the sleep mode clock, wherein the frequency variations result from the sleep mode clock operating at a different frequency during sleep mode than during a calibration period.

6. The calibrator according to claim 5 wherein the calibrator compensates for frequency variations by modifying the relative frequency by a factor.

7. A wireless communications mobile station wherein data is segmented into frames having a duration T0, said mobile station comprising:

a. transmitting circuitry which transmits as spread spectrum signals data provided by a user;

b. receiving circuitry which receives spread spectrum signals and converts the signals into a form intelligible to the user;

c. PN sequence generator circuitry operationally connected to the transmitting circuitry and the receiving circuitry;

d. a chip rate clock, operating at a chip rate, which clocks the PN sequence generator circuitry and which can be turned off during sleep mode;

e. sleep mode logic circuitry;

f. a sleep mode clock which clocks the sleep mode logic circuitry;

g. a super chip rate clock which operates at a frequency S which is N times the chip rate;

h. a frame counter which contains a value FRMS at the end of a calibration period; and i. a calibrator for calibrating said sleep mode clock to the chip rate clock before entry into sleep mode, said calibrator comprising:

a first counter, clocked by the super chip rate clock, which counts T0*S cycles of the super chip rate clock through one data frame, then rolls over to zero;

a second counter which counts cycles of the sleep mode clock;

a first register which stores a first value CNTSLP which is input from the second counter at the end of a calibration period and subsequently at wake up time;

a second register which stores a second value SYSTIME1 which is input from the first counter at the beginning of a calibration period;

a third register which stores a third value SYSTIME2 which is input from the first counter at the end of a calibration period, wherein wake up time is calculated using a relative frequency which is equal to

[SYSTIME2−SYSTIME1+(T0*S)(FRMS)]/CNTSLP.

8. The wireless communications mobile station according to claim 7 wherein said sleep mode clock runs between 31 kHz and 33 kHz.

9. The wireless communications mobile station according to claim 7 wherein storage of SYSTIME1 and SYSTIME2 is synchronized to the sleep mode clock.

10. The wireless communications mobile station according to claim 7 wherein wake up can be initiated by a user before a sleep period ends.

11. The wireless communications mobile station according to claim 7 wherein said calibrator compensates for frequency variations in the sleep mode clock, wherein the frequency variations result from the sleep mode clock operating at a different frequency during sleep mode than during a calibration period.

12. The wireless communications mobile station according to claim 11 wherein the calibrator compensates for frequency variations by modifying the relative frequency by a factor.

13. A method for high resolution calibration of a sleep mode clock in a wireless communications mobile station to a chip rate clock operating at a chip rate and which can be turned off during sleep mode, wherein data is segmented into frames having a duration T0, and the mobile station includes a super chip rate clock which operates at a frequency S which is N times the chip rate, and a frame counter which contains a value FRMS at the end of a calibration period, said method comprising the steps of:

counting in a first counter T0*S cycles of the super chip rate clock through each data frame;

counting in a second counter cycles of the sleep mode clock;

storing in a first register a first value CNTSLP which is input from the second counter at the end of a calibration period and subsequently at wake up time;

storing in a second register a second value SYSTIME1 which is input from the first counter at the beginning of a calibration period;

storing in a third register a third value SYSTIME2 which is input from the first counter at the end of a calibration period, determining wake up time using a relative frequency which is equal to

[SYSTIME2−SYSTIME1+(T0*S)(FRMS)]/CNTSLP.

14. The method according to claim 13 wherein wake up can be initiated by a user before a sleep period ends.

15. The method according to claim 13 wherein the method compensates for frequency variations in the sleep mode clock, wherein the frequency variations result from the sleep mode clock operating at a different frequency during sleep mode than during a calibration period.

16. The method according to claim 15 wherein the method compensates for frequency variations by modifying the relative frequency by a factor.

17. A wireless communications system comprising:
a. a mobile station,
b. a base station subsystem which controls the radio link with the mobile station, and
c. a network subsystem which is interfaced with a public fixed network and the base station subsystem, wherein said mobile station comprises the following:
  (1) transmitting circuitry which transmits as spread spectrum signals data provided by a user;
  (2) receiving circuitry which receives spread spectrum signals and converts the signals into a form intelligible to the user;
  (3) PN sequence generator circuitry operationally connected to the transmitting circuitry and the receiving circuitry;
  (4) a chip rate clock, operating at a chip rate, which clocks the PN sequence generator circuitry and which can be turned off during sleep mode;
  (5) sleep mode logic circuitry;
  (6) a sleep mode clock which clocks the sleep mode logic circuitry;
  (7) a super chip rate clock which operates at a frequency S which is N times the chip rate;
  (8) a frame counter which contains a value FRMS at the end of a calibration period; and
  (9) a calibrator for calibrating said sleep mode clock to the chip rate clock before entry into sleep mode, said calibrator comprising:
    a first counter, clocked by the super chip rate clock, which counts T0*S cycles of the super chip rate clock through one data frame, then rolls over to zero;
    a second counter which counts cycles of the sleep mode clock;
    a first register which stores a first value CNTSLP which is input from the second counter at the end of a calibration period and subsequently at wake up time;
    a second register which stores a second value SYSTIME1 which is input from the first counter at the beginning of a calibration period;
    a third register which stores a third value SYSTIME2 which is input from the first counter at the end of a calibration period,
    wherein wake up time is calculated using a relative frequency which is equal to

[SYSTIME2−SYSTIME1+(T0*S)(FRMS)]/CNTSLP.

18. The wireless communications system according to claim 17 wherein storage of SYSTIME1 and SYSTIME2 is synchronized to the sleep mode clock.

19. The wireless communications system according to claim 17 wherein said sleep mode clock runs between 31 kHz and 33 kHz.

20. The wireless communications system according to claim 17 wherein said sleep mode clock runs between 32 kHz minus 50 ppm and 32 kHz plus 50 ppm.

21. The wireless communications system according to claim 17 wherein said sleep mode clock runs at about 32 kHz.

22. The wireless communications system according to claim 17 wherein wake up can be initiated by a user before a sleep period ends.

23. The wireless communications system according to claim 17 wherein said calibrator compensates for frequency variations in the sleep mode clock, wherein the frequency variations result from the sleep mode clock operating at a different frequency during sleep mode than during a calibration period.

24. The wireless communications system according to claim 23 wherein the calibrator compensates for frequency variations by modifying the relative frequency by a factor.

25. The wireless communications system according to claim 22 wherein the first counter is reset, and the first register is loaded from the second counter, upon wake up synchronous to the first sleep mode clock cycle after wake up is initiated.

* * * * *